No. 836,107. PATENTED NOV. 20, 1906.
L. H. FLANDERS.
SECONDARY BATTERY.
APPLICATION FILED APR. 15, 1905.
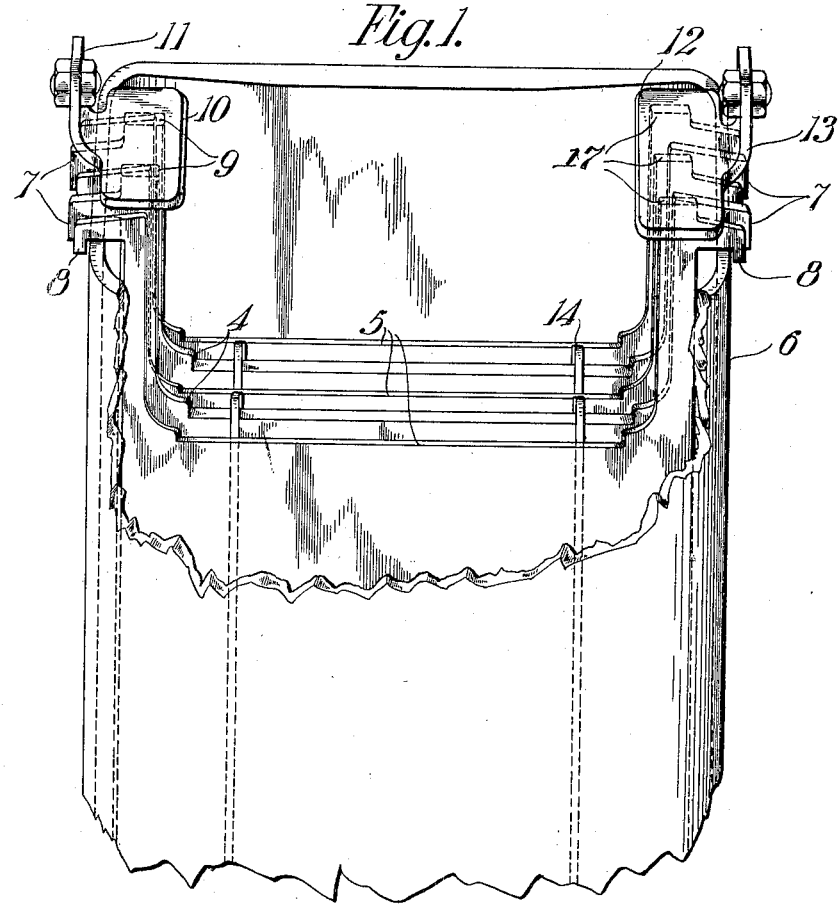

UNITED STATES PATENT OFFICE.

LOUIS H. FLANDERS, OF WILKINSBURG, PENNSYLVANIA, ASSIGNOR TO THE WESTINGHOUSE MACHINE COMPANY, A CORPORATION OF PENNSYLVANIA.

SECONDARY BATTERY.

No. 836,107.      Specification of Letters Patent.      Patented Nov. 20, 1906.

Application filed April 15, 1905. Serial No. 255,744.

*To all whom it may concern:*

Be it known that I, LOUIS H. FLANDERS, a citizen of the United States, and a resident of Wilkinsburg, in the county of Allegheny and State of Pennsylvania, have invented a new and useful Improvement in Secondary Batteries; of which the following is a specification.

This invention relates to secondary batteries, and more particularly to separators for said batteries.

The object of this invention is the production of a simple and effective separator.

This and other objects I attain in a secondary battery embodying the features herein described, illustrated, and set forth.

In the drawings accompanying this application and forming a part thereof, Figure 1 is a partial perspective projection of a secondary cell, showing a mode of assembling, separating, and supporting the electrodes embodying this invention. Fig. 2 is a perspective projection of an insulating-separator. Fig. 3 is a partial section of the electrodes of a secondary battery in connection with a partial elevation of a separator.

Referring to the drawings, the two sets of electrodes 4 and 5 are supported on the wall 6 of the containing-jar by supporting lugs or hooks 7. Two such hooks are rigidly mounted to each plate or electrode, and each hook is supplied with a downwardly-extending portion 8, which projects over the edge of the containing-jar. This prevents the lugs or supporting-hooks from sliding off the supporting edge and allowing the electrodes to drop into the jar when the cell is subjected to vibrations or expansion or when buckling of the electrodes occur. This construction permits considerable clearance to be maintained between the edges of the plates or electrodes and the ends of the containing-jar.

On one of the hooks 7, connected to each of the electrodes, is a lug 9. The plates are so arranged in the jar that the lug-carrying hooks on oppositely-charged electrodes are supported on opposite ends of the jar. The positively-charged set of plates 4 are integrally connected by the lugs 9 to a connecting-strap 10, which is supplied with a portion 11, constituting the positive terminal of the cell. The negative plates 5 are connected in the same manner by the lugs 17 to the connecting-strap 12 to which the negative terminal 13 is attached.

Insulating separator-rings 14 are placed on the positive electrodes. The insulating-rings will be as effective if mounted on the negative plate; but for the arrangement of plates illustrated it is more convenient to place them on the positive electrode, as a fewer number are then needed. The separator-ring 14 is supplied with a prong 15 at the top of its inside edge which projects into a conveniently-located indentation 16 in the positive electrode. The indentation may be made by driving the prong 15 into the plate, if the plate is made of soft lead. This arrangement and mode of supporting the separator prevents it from being displaced by the vibrations or expansion which may take place in the plate. The combination of this separator-ring with the plates, which are connected into two integral sets by the connecting-straps 10 and 12, produces a secondary cell in which there is slight tendency for motion or vibration of the plates and one in which the plates are effectively insulated.

What I claim is—

1. In a secondary battery, a container, and plates or electrodes in combination with a spacing or insulating member encircling said electrodes and provided with a pointed retaining-lug.

2. In a secondary battery, a container and plates or electrodes in combination with a spacing or insulating member arranged between said electrodes and provided with a downwardly-extending retaining-lug.

3. In a secondary battery, a container and plates or electrodes in combination with a spacing or insulating member comprising an encircling-ring provided at the top with a downwardly-extending and pointed retaining-lug.

4. A separator for storage-battery electrodes comprising an encircling insulating-ring provided with a downwardly-extending lug arranged to coöperate with a recess formed in the electrode.

In testimony whereof I have hereunto subscribed my name this 14th day of April, 1905.

LOUIS H. FLANDERS.

Witnesses:
    DAVID WILLIAMS,
    JNO. S. GREEN.